United States Patent Office 2,755,444
Patented July 17, 1956

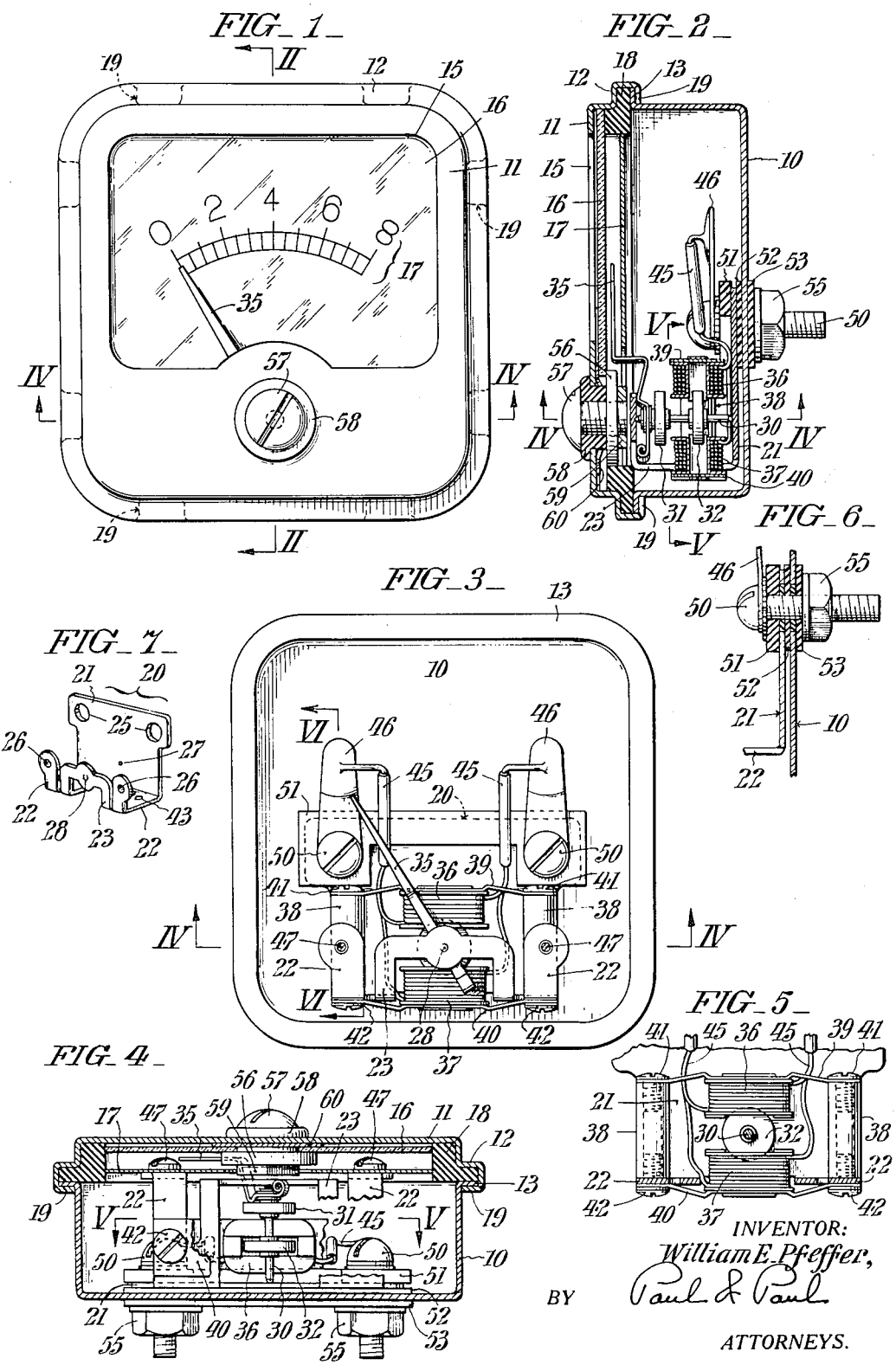

2,755,444

ELECTRICAL MEASURING INSTRUMENTS

William E. Pfeffer, Perkasie, Pa., assignor to Paul Mood, Lester Void, and William E. Pfeffer, copartners, trading under the name of The Electro-Mechanical Instrument Company, Perkasie, Pa.

Application February 5, 1952, Serial No. 270,036

2 Claims. (Cl. 324—154)

This invention relates to electrical measuring instruments. More specifically it is concerned with voltmeters or ammeters, i. e., instruments of the galvanometer type, useful in measuring the potential and strength of current flow in electric circuits.

The chief aim of my invention is to secure the advantages of economy and ease of assembly resulting from simplified construction of such instruments, without sacrifice in the accuracy of the indicated readings.

In connection with an electrical measuring instrument having the foregoing attributes, it is further aim of my invention, to provide simple zero adjusting means which is so constructed and arranged as to be regulatable from the exterior of a casing in which the working parts of the instrument are housed.

Other objects and attendant advantages will appear from the following detailed description of the attached drawings, wherein:

Fig. 1 shows the front elevation of my improved electrical measuring instrument.

Fig. 2 is a transverse vertical section taken as indicated by the angled arrows II—II in Fig. 1.

Fig. 3 is a front view of the instrument with the cover component of its casing removed.

Fig. 4 is a horizontal section taken as indicated by the angled arrows IV—IV in Figs. 1–3.

Fig. 5 is a fragmentary view in section taken as indicated by the angled arrows V—V in Figs. 2 and 4.

Fig. 6 is a fragmentary detail view in section taken as indicated by the angled arrows VI—VI in Fig. 3; and Fig. 7 is a perspective view of one of the internal parts of the instrument.

As herein exemplified, my improved electric measuring instrument has a generally rectangular casing fashioned in practice from sheet iron or steel with a box-like main component 10 and a cover component 11, which latter is offset perimetrically as at 12 to fit over an outstanding perimetric flange 13 at the open end of said main component. Cover component 11 is provided with a window 15 which is backed by a sheet 16 of glass or the like through which the graduated dial indicated at 17 can be observed. Cover component 11 is secured in place, after interposition of a sealing gasket 18 between the transparent sheet 16 and the flange 13 of component 10 as shown in Figs. 1, 2 and 4, by knocking the tab projections 19 on the offset 12 over upon said flange.

Lodged within the hollow of main component 10 of the casing is an insert unit which comprises a frame 20 which may be of brass or other non-magnetizable material. As best seen in Fig. 7, frame 20 has an upright front portion with angular bracket arms 22 extending forwardly from the bottom corners, and with a similarly configured split bracket arm 23 intermediate said arms 22. The back portion 21 of frame 20 is provided, adjacent the top, with a pair of laterally spaced apertures 25, and the upstanding portions of arms 22 are provided with tapped holes 26 for a purpose presently explained.

With its pointed ends engaged in spot indentations 27 and 28 respectively in the back 21 and in the central bracket projection 23 of frame 20, is an arbor 30 which carries a pair of permanent magnets 31 and 32 of discous configuration. Also affixed to arbor 30 is a pointer 35 which, see Fig. 2, is bent forwardly and then upwardly to the front of dial 17 for co-ordination with arcuately arranged graduations on the latter as shown in Fig. 1. With reference again to Fig. 2, it will be seen that arbor magnet 32 extends edgewise partway into the hollows of a pair of electro-magnet coils 36 and 37 which are equally spaced relative to arbor 30 and in axial alignment vertically. Upstanding from the horizontal portions of the end bracket arms 22 of frame 20 are posts 38, and bridged between the tops of the latter is a cross piece 39 whereby the upper magnet coil 36 is supported. The lower magnet coil 37 is similarly supported by a cross piece 40 whereof the ends underlap the horizontal portions of bracket arms 22. Cross piece 39 is secured by cap screws 41 (see Fig. 5) whereof the shanks threadedly engage into the tops of posts 38. Cross piece 40 is similarly secured by screws 42 whereof the shanks pass through pre-located holes 43 (Fig. 7) in the bracket arms 22 and threadedly engage into the bottoms of said posts. Coils 36 and 37 are connected in parallel as shown in Figs. 3, 4 and 5, and the leads 45 from them are soldered to apertured lugs 46 as shown in Fig. 3. Dial 17 is secured by cap screws 47 whereof the shanks engage into the tapped holes 26 in the tops of the upstanding portions of the end bracket arms 22 of frame 20, see Figs. 3 and 4.

The assemblage just described is made fast by means of cap screws 50 which serve as the terminals of the instrument, and which are insulated from the casing by strips 51, 52, and 53 of paper or compressed fiber or other di-electric material, said strips and the back wall of casing component having apertures spaced to correspond with the apertures 25 in the vertical portion 21 of frame 20 for passage of the shanks of said screws outwardly through said wall. As shown in Figs. 2, 4 and 6, strip 51 is interposed between the lugs 46 and the front face of the upright portion 21 of bracket 20, strip 52 between the rear face of said bracket portion and the rear wall of casing component 10, and strip 53 between the external face of the rear wall of said casing component and nuts 55 applied to the protruding ends of the screw shanks.

For the purpose of maintaining the pointer normally in zero position, I have provided in accordance with my invention, a restoring magnet 56 which, like the arbor magnets 31 and 32, is discous in configuration and of the permanent variety, the same being located at the back of the cover component 11 below the window, in axial alignment with the arbor 30 as best shown in Figs. 2 and 4. Restoring magnet 56 is threaded onto the shank of a screw 57 which is passed through shouldered non-metallic bushing 58 engaged in an aperture in the casing cover component 11 and which is secured against relative rotation by a clamp nut 59, said bushing being retained by the spring nut indicated at 60. The head of screw 57 is slotted so that restoring magnet 56 can be rotatively adjusted by means of a screw driver or the like from the exterior of the instrument.

From the foregoing, it will be seen that my improved meter is simple in construction, easily and quickly assembled and capable of ready adjustment for maintenance of its pointer normally in zero indicating position.

Having thus described my invention, I claim:

1. In an electric measuring instrument, a casing; a pair of spaced coaxially-arranged hollow coils within the casing; a pointer-carrying arbor supported for rotation in the interval between the coils; a permanent magnet disk affixed to the arbor, the plane of the disk being in the axial plane of the two coils and portions of the disk extending into the hollows of the respective coils; a second permanent magnet disk on the arbor adjacent one side of the coils; a permanent discoid restoring magnet mounted on the front of the casing with capacity for rotative adjustment within the casing independently of the arbor but in coaxial relation to the latter for reaction with said second arbor magnet; and means whereby the restoring magnet can be rotatively adjusted from the exterior of the casing the plane of rotation being substantially parallel to the plane of rotation of said second arbor magnet.

2. An electric measuring instrument according to claim 1, wherein the second arbor magnet is positioned on the arbor in an interval between the coils and the front of the casing; and wherein the restoring magnet is affixed to the inner end of a pivot element rotatively borne in the front of the casing and provided at its outer end with a manipulating head.

References Cited in the file of this patent

UNITED STATES PATENTS

| | | |
|---|---|---|
| 870,376 | Manley | Nov. 5, 1907 |
| 1,486,085 | Gelatt | Mar. 4, 1924 |
| 2,102,409 | Faus | Dec. 14, 1937 |
| 2,500,628 | Clark | Mar. 14, 1950 |

FOREIGN PATENTS

| | | |
|---|---|---|
| 319,744 | Great Britain | Sept. 27, 1928 |